United States Patent
Totani et al.

[11] Patent Number: 6,144,182
[45] Date of Patent: Nov. 7, 2000

[54] MOTOR CONTROL METHOD FOR INJECTION MOLDING MACHINE AND MOTOR CONTROLLER FOR CARRYING OUT THE SAME

[75] Inventors: Tsuginobu Totani, Numazu; Fumiyuki Katoh, Nagaizumi-Cho; Kiyoshi Sasaki, Mishima; Yukio Iimura; Jun Koike, both of Shimizu-Cho; Masahiro Tamaki, Susono; Yutaka Yamaguchi, Kannami-Cho, all of Japan

[73] Assignee: Toshiba Kikai Kabushiki Kaisha, Tokyo-to, Japan

[21] Appl. No.: 09/487,247

[22] Filed: Jan. 19, 2000

[30] Foreign Application Priority Data

Jan. 19, 1999 [JP] Japan .................................. 11-011071

[51] Int. Cl.$^7$ ............................. B29C 45/77; G05B 11/01
[52] U.S. Cl. ......................... 318/632; 318/571; 318/640; 425/144; 425/145; 264/40.3; 264/40.5
[58] Field of Search ..................................... 318/524, 138, 318/560–696; 425/144, 145, 143, 149, 207, 150, 589, 550, 156, 159; 264/40.3, 40.5, 40.7, 40.6, 211.21, 328.14, 328.13; 364/477, 476, 178, 143

[56] References Cited

U.S. PATENT DOCUMENTS

| Re. 31,903 | 6/1985 | Faillace ........................................ 165/12 |
| 4,988,273 | 1/1991 | Faig et al. .................................... 425/145 |
| 5,030,395 | 7/1991 | Kamiguchi et al. ...................... 264/40.5 |
| 5,210,698 | 5/1993 | Topmiller .................................. 364/476 |
| 5,371,450 | 12/1994 | Hiraoka .................................... 318/560 |
| 5,456,870 | 10/1995 | Bulgrin .................................. 264/40.6 |

*Primary Examiner*—Paul Ip
*Attorney, Agent, or Firm*—Pillsbury Madison & Sutro LLP

[57] ABSTRACT

The duty of a current to be supplied to an injection motor is calculated on the basis of the ratio between set injection time for which the injection motor operates and molding cycle time, a shaft torque of the injection motor is calculated on the basis of a set maximum injection force of the injection molding condition, a maximum current for the injection motor is determined on the basis of the calculated shaft torque, and it is decided that the injection motor is overloaded, an alarm is given, a duty for a current that enables continuous molding is retrieved for the maximum current, a state that enables continuous molding is displayed and the molding cycle time determining the duty of the current that enables continuous molding is corrected when the current having the calculated desired duty is smaller than the maximum current.

5 Claims, 2 Drawing Sheets

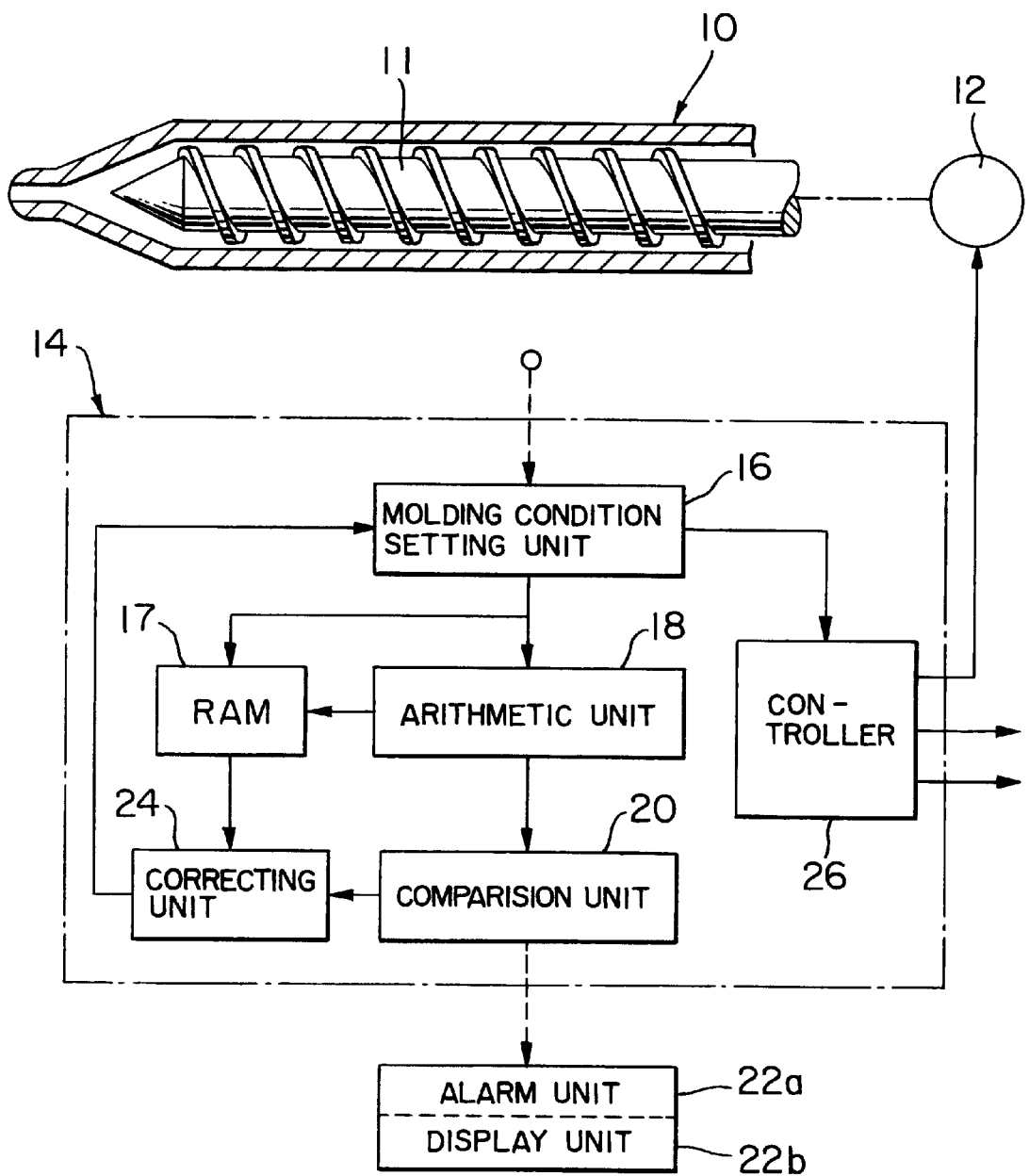
F I G. 1

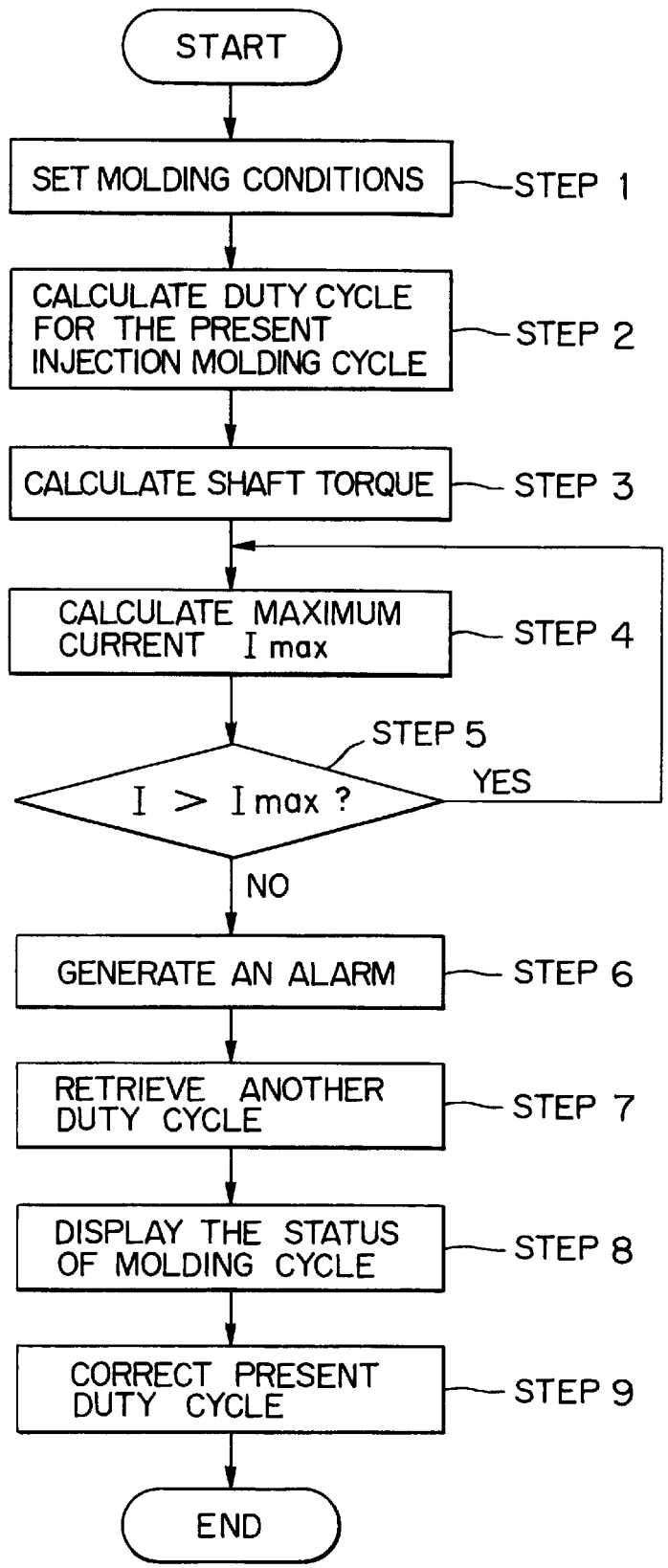
F I G. 2

MOTOR CONTROL METHOD FOR INJECTION MOLDING MACHINE AND MOTOR CONTROLLER FOR CARRYING OUT THE SAME

BACKGROUND OF THE INVENTION

1. Field of the Invention

The present invention relates to an injection molding machine driven by a electric motor, such as a servomotor and, more particularly, to a motor control method and a motor controller for an injection molding machine to avoid an overloaded or overheated operating condition of the motor.

2. Description of the Related Art

A motor used as a driving source for an injection molding machine drives a screw of the injection molding machine for injecting the molten material into a mold, holding pressure in the mold, and applying back pressure to the molten material during charging process. During an operation for injecting or applying back pressure, the output torque of the motor can be decreased and the magnitude of the drive current applied to the motor is relatively low. But, during holding pressure phase, the output torque of the motor should be increased and the motor demands a very high driving current.

A motor of this kind is selected mainly from the economical point of view, taking design requirements into consideration. Generally, it is rare to adopt a large capacity motor with a continuous rating current enough to exceeded driving current greatly. Therefore, in some cases, the motor demands a driving current greatly exceeding its continuous rating current during the pressure holding operation, and the mean value of the driving current supplied to the motor in one injection molding cycle exceeds the continuous rating current. Since the amount of heat generated by the motor is proportional to the square of the driving current, it is possible that the motor overheats when the mean value of the driving current supplied to the motor in one injection molding cycle exceeds the continuous rated current. A motor control method for an injection molding machine to prevent the overheating of a motor included in the injection molding machine is proposed in JP-B No. 1992-46215. This prior art motor control method comprises steps of measuring the total amount of heat actually generated by the motor in one injection molding cycle of the injection molding machine, comparing the total amount of heat actually generated by the motor with a rated amount of heat that will be generated by the motor if a current equal to the continuous rating current of the motor is supplied to the motor, deciding that the motor is overheating when the total amount of heat actually generated by the motor exceeds the rated amount of heat, and carrying out an overheat avoiding operation if it is decided that the motor is overheating.

Another motor control method for an injection molding machine is proposed in JP-B No. 1992-51332. This prior art motor control method for an injection molding machine comprises steps of sampling a current supplied to the motor at predetermined intervals in one injection molding cycle, calculating the ratio between the sum of the products each of the square of a measured current value and the sampling interval, and the product of the square of a maximum current that can be supplied to the motor and the period of the injection molding cycle, deciding whether or not the motor is overheating on the basis of the ratio, and suspending an injection molding operation to extend the period of the injection molding cycle if it is decided that the motor is overheating.

In the prior art mentioned above, a servomotor with continuous rating is adopted. The servomotor is provided with a sensor for measuring the temperature of the servomotor to protect the servomotor from overheating.

Although the injection molding cycle needs to be repeated without interruption so as to produce molded products continuously, the servomotor is stopped to interrupt the injection molding cycle when the temperature of the servomotor measured by the sensor exceeds an upper limit and a motor protecting function is actuated. The interruption of the injection molding cycle often incurs increase in production costs and decrease in productivity.

SUMMARY OF THE INVENTION

Accordingly, it is an object of the present invention to provide a motor control method for an injection molding machine, capable of notifying an overloaded state of the motor without impeding the production of the injection molding machine, of calculating a molding cycle that enables continuous molding and changing molding conditions for the present molding cycle when the motor is overloaded, and of always simply, efficiently and economically achieving the control of operations for injection molding, and to provide a motor controller for carrying out the motor control method.

According to one aspect of the present invention, a motor control method for an injection molding machine comprises: preparing a duty cycle data table beforehand including diverse duty cycles and values of allowable current corresponding to a given duty cycle; setting a duty cycle for an injection motor on the basis of ratio between a predetermined injection period for which the injection motor operates and a predetermined injection molding cycle;

calculating a shaft torque of the injection motor on the basis of set injection forces of the injection molding condition; determining a maximum current for the injection motor on the basis of the calculated motor shaft torque; comparing the allowable current for the set duty cycle with the maximum current; deciding that the injection motor is overloaded when the allowable current is lower than the maximum current; retrieving another duty cycle corresponding the maximum current from the duty cycle data table so as to enables the injection molding cycle to repeat continuously; and correcting time sharing of the injection molding cycle on the basis of the retrieved duty cycle.

According to another aspect of the present invention, a motor controller for carrying out the motor control method for an injection molding machine comprises: a storing means for a duty cycle data table beforehand including diverse duty cycles and values of allowable current corresponding to a given duty cycle; a setting means for injection molding condition data and a duty cycle for an injection motor on the basis of ratio between a predetermined injection period for which the injection motor operates and a predetermined injection molding cycle; a calculating means for calculating a shaft torque of the injection motor on the basis of a set injection forces of the injection molding condition, and determining a maximum current for the injection motor on the basis of the calculated motor shaft torque; a deciding means for comparing the allowable current for the set duty cycle with the maximum current, and deciding that the injection motor is overloaded when the allowable current is lower than the maximum current; a correction means for retrieving another duty cycle corresponding the maximum current from the duty cycle data table so as to enables the injection molding cycle to repeat continuously, and correcting time sharing of the injection molding cycle on the basis of the retrieved duty cycle.

When a injection motor, such as a servomotor of a short-time rating is used, the overloaded state of the motor can be known without causing any difficulty in continuity of the injection molding cycle. As a injection molding cycle that enables continuous molding is calculated when the motor is overloaded, duty cycle for the present molding cycle are changed, the number of shots that can be achieved by the present molding cycle can be estimated and efficient, economical motor control can be achieved.

BRIEF DESCRIPTION OF THE DRAWINGS

The above and other objects, features and advantages of the present invention will become more apparent from the following description taken in connection with the accompanying drawings, in which: and FIG. 1 is a block diagram of a motor controller for an injection molding machine, in a preferred embodiment according to the present invention; and.

FIG. 2 is a flow chart of a motor control method for an injection molding machine, in a preferred embodiment according to the present invention.

DESCRIPTION OF THE PREFERRED EMBODIMENTS

FIG. 1 shows a motor controller 14 for controlling an injection motor 12 included in an injection molding machine 10. The injection motor 12 which is controlled by a controller 26 drives screw 11 to move forward and backward during injection process. The motor controller 14 includes an injection molding condition setting unit 16 and RAM 17 which stores injection molding condition data, etc., and an arithmetic unit 18. The arithmetic unit 18 calculates duty cycles of a current to be supplied to the injection motor 12 on the basis of the ratio between injection period for which the injection motor 12 moves the screw 11 forward to inject molten material into a mold and injection molding cycle previously stored in the RAM 17.

The duty cycle(efficiency) of a current supplied to the injection motor 12 is calculated by using Expression (1).

(Duty cycle)={(Injection period)/(Injection molding cycle)}(100%)={TR1/(TR1+TR3+TR4)}(100%)   (1)

where TR1 is injection period, TR3 is cooling period and TR4 is an interval before the next injection cycle.

The allowable currents corresponding to each duty cycle (at intervals of a predetermined percentage) of currents for the injection motor 12 are determined by using the rating current In of the injection motor 12 and current multiplying factors as follows.

Duty cycle(%) 100 . . . 70 . . . 50 . . . 20 . . .

Allowable current (A) In . . . 1.2In . . . 1.4In . . . 1.8In . . .

The allowable currents corresponding to each duty cycle determined on the basis of the rated current In of the injection motor 12 are prepared and stored as a form of data table in the RAM 17. Current multiplying factors are determined taking into consideration temperature conditions including temperature rise in the injection motor 12 due to heat radiation. The arithmetic unit 18 calculates a shaft torque of the injection motor 12 on the basis of a set maximum torque of the injection motor 12 as follows.

The shaft torque of the injection motor 12 is proportional to current. The shaft torque of the injection motor 12 is determined by multiplying the set injection forces by a proportional constant. The set injection forces are determined according to injection molding conditions.

(Shaft torque T)=(Set injection force) $(km)$.   (2)

where km is the proportional constant depending on reduction gear ratio, etc.

FIG. 2 shows a flowchart for controlling the injection motor 12 on the basis of foregoing condition setting.

In step 1, an operator enters injection conditions data including the injection period TR1, the cooling time TR3, the interval TR4 and the set torque Pi and PH1 to PH3 into the molding condition setting unit 16, where Pi is a injection force during injection phase, PH1 to PH3 are injection forces during holding pressure phase. In step 2, a arithmetic unit 18 calculates the cycle period and duty cycle by using Expression (3) and (4).

Cycle period=TR1+TR3+TR4   (3)

Duty cycle={TR1/(Cycle period)}(100(%)).   (4)

The allowable current I corresponding to the determined duty cycle is read out from the data table in RAM 17 and transferred to a comparison unit 20.

In step 3, shaft torque T of the injection motor 12 is calculated by the arithmetic unit 18 on the basis of maximum set values among the set injection forces Pi and PH1 to PH3 by using Expression (2). In step 4, the arithmetic unit 18 calculates a maximum current Imax provided for the injection motor 12 by using Expression (5):

Imax=T/k   (5)

where k is a proportional constant.

Alternatively, the maximum current Imax provided for the injection motor 12 can be determined by using a torque-current conversion table for converting the shaft torque T into a corresponding current. In step 5, the allowable current I for the determined duty is compared with the maximum current Imax provided for the injection motor 12 by the comparison unit 20. It is decided by the comparison unit 20 that the injection motor 12 would run normally if the allowable current I for the determined duty is greater than the maximum current Imax provided for the injection motor12. On the other hand, it is decided that the injection motor 12 would be overloaded if the allowable current I for the determined duty is smaller than the maximum current Imax.

When it is determined that the motor would be overloaded, an alarm is generated by a alarm unit 22a in step 6. In next step 7, a appropriate duty cycle that enables a continuous injection molding cycle is determined by the correcting unit 24 on the basis of the maximum current Imax. That is, the duty cycle that corresponds to the maximum current Imax is retrieved from data table previously stored in the RAM 17. The duty thus determined enables the injection motor 12 to running continuously during the injection molding cycle. In step 8, the duty cycle that enable the injection molding cycle to running continuously is displayed in a display unit 22b to inform the operator of the status thereof. After the determination of the duty cycle that enables continuous injection molding cycle, time sharing for the presently set duty cycle must be corrected in step 9. The correction of the present duty cycle is executed in response to operator's acknowledgment. For this correction, the interval TR4 is changed and replaced by new interval data by the molding condition setting unit 16.

As is apparent from the foregoing description, according to the present invention, the operator is informed of a state where the motor, such as a servomotor of a short-time rating, is overloaded without impeding the molding operation of the injection molding machine, changes the molding conditions for the present injection molding cycle, estimates the number of possible shots in the present molding cycle, and controls the injection molding machine for efficient, economically satisfactory injection molding operation. The motor control method of the present invention prevents the interruption of the injection molding operation due to the overheating of the motor controller.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A motor control method for an injection molding machine, said method comprising steps of:

preparing a duty cycle data table beforehand including diverse duty cycles and values of allowable current corresponding to a given duty cycle; setting a duty cycle for an injection motor on the basis of ratio between a predetermined injection period for which the injection motor operates and a predetermined injection molding cycle;

calculating a shaft torque of the injection motor on the basis of set injection forces of the injection molding condition;

determining a maximum current applied to the injection motor on the basis of the calculated motor shaft torque;

comparing theallowablecurrent forthesetdutycycle with the maximum current;

deciding that the injection motor is overloaded when the allowable current is lower than the maximum current;

retrieving another duty cycle corresponding the maximum current from the duty cycle data table; and correcting time sharing of the present duty cycle on the basis of the retrieved duty cycle so as to enables the injection molding cycle to repeat continuously.

2. The motor control method according to claim 1, wherein the values of the allowable current are determined by multiplying a rating current In of the injection motor and a multiplying factor which is determined by taking into consideration for temperature condition of the injection motor.

3. The motor control method according to claim 1, wherein the time sharing of the present duty cycle is corrected by increasing or decreasing a set interval time before the next injection molding cycle begins.

4. A motor controller for an injection molding machine, comprising:

a storing means for storing duty cycle data table including diverse duty cycles and values of allowable current corresponding to a given duty cycle; a setting means for injection molding condition data and a duty cycle for an injection motor on the basis of ratio between a predetermined injection period for which the injection motor operates and a predetermined injection molding cycle;

a calculating means for calculating a shaft torque of the injection motor on the basis of set injection forces of the injection molding condition, and determining a maximum current applied to the injection motor on the basis of the calculated motor shaft torque;

a deciding means for comparing the allowable current for the set duty cycle with the maximum current, and deciding that the injection motor is overloaded when the allowable current is lower than the maximum current;

a correcting means for retrieving another duty cycle corresponding the maximum current from the duty cycle data table, and correcting time sharing of the present duty cycle on the basis of the retrieved duty cycle so as to enables the injection molding cycle to repeat continuously.

5. The motor controller according to claim 4, further comprising an alarm means for generating a alarm when it is decided that the injection motor is overloaded.

* * * * *